United States Patent
Won et al.

(10) Patent No.: US 8,326,526 B2
(45) Date of Patent: Dec. 4, 2012

(54) METHOD FOR EXCHANGING MESSAGES IN A NAVIGATION SYSTEM USING VISIBLE LIGHT COMMUNICATIONS

(75) Inventors: Eun-Tae Won, Seoul (KR); Jong-Hoon Ann, Suwon-si (KR); Dae-Seok Kim, Seoul (KR); Noh-Gyoung Kang, Seoul (KR); Seung-Hoon Park, Seoul (KR); Jae-Seung Son, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/329,527

(22) Filed: Dec. 19, 2011

(65) Prior Publication Data

US 2012/0089325 A1    Apr. 12, 2012

Related U.S. Application Data

(60) Division of application No. 13/219,088, filed on Aug. 26, 2011, now Pat. No. 8,180,565, which is a continuation of application No. 12/336,744, filed on Dec. 17, 2008, now abandoned.

(30) Foreign Application Priority Data

Dec. 18, 2007   (KR) .................. 10-2007-0133315

(51) Int. Cl.
   *G01C 21/00*   (2006.01)
(52) U.S. Cl. ...................................................... 701/410
(58) Field of Classification Search ................. 701/400, 701/409, 410, 418, 421, 432
   See application file for complete search history.

(56) References Cited

U.S. PATENT DOCUMENTS

| | | | |
|---|---|---|---|
| 6,879,263 B2* | 4/2005 | Pederson et al. | 340/815.45 |
| 2002/0011941 A1* | 1/2002 | Endo et al. | 340/995 |

* cited by examiner

*Primary Examiner* — Kim T Nguyen
(74) *Attorney, Agent, or Firm* — Cha & Reiter, LLC

(57) ABSTRACT

Method and device for exchanging messages in a VLC navigation system is provided, in which a map server generates a provision message in the form of visible light signals through all lamps in an area, using a PLC network, where a navigation service is provided, a terminal that wants to implement the navigation service among terminals that have received the provision message transmits a registration request message to the map server, the map server transmits a registration response message for the registration request message to the terminal, the terminal transmits a map request message including information about a destination to the map server, the map server transmits a map response message including information about a path to the destination to the terminal, and the terminal displays map information and the path.

8 Claims, 6 Drawing Sheets

METHOD FOR EXCHANGING MESSAGES IN A NAVIGATION SYSTEM USING VISIBLE LIGHT COMMUNICATIONS

CLAIM OF PRIORITY

This is a division application of U.S. application Ser. No. 13/219,088 filed on Aug. 26, 2011 now U.S. Pat. No. 8,180,565, which is a continuation of U.S. application Ser. No. 12/336,744 filed on Dec. 17, 2008 now abandoned, which claims priority to Korean Applications No. 2007-0133315 filed in the Republic of Korea on Dec. 18, 2007, all of which are hereby incorporated by reference in their entirety.

BACKGROUND OF THE INVENTION

1. Field of the Invention

The present invention generally relates to a Visible Light Communication (VLC) navigation system and more particularly, to a method for exchanging messages between a visible light terminal and a navigation server in a navigation system.

2. Description of the Related Art

Owing to the improved light emission efficiency and decreased price of Light Emitting Diodes (LEDs), LEDs have gained popularity in the general lighting market, which includes fluorescent lighting and incandescent lighting, as well as in the special lighting market, including portable devices, displays, cars, signal signs, and advertisement boards.

Also, optical wireless communication technology, as complimentary to RF technology, has attracted much interest due to the shortage of Radio Frequency (RF) bands, the possibility of interference between different radio communication technologies, increased demands for communication security, and the advent of an ultra-high ubiquitous communication environment of $4^{th}$ Generation (4G) radio technology. In this context, many companies and research institutes are studying VLC using visible light LEDs.

VLC for transmitting information by light visible to the human eye offers the benefits of a wide bandwidth, free use, without restrictions, compared to wave communications, visibility of the destination or passage of light, and the resulting accurate detection of an information reception range. Therefore, VLC is reliable in terms of security and consumes low power. In this context, VLC can be applied to hospitals and airplanes where RF use is restricted and provide additional information services through an advertisement board. A VLC system will be described below.

FIG. 1A illustrates a conventional VLC system. The conventional VLC system includes LED or Laser Diode (LD) lamps 141, 142 and 143 for acting as lights and transmitting and receiving data by visible light, and communication devices 150 and 160 each having a visible transceiver module for transmitting and receiving data to and from the lamps 141, 142 and 143. The communication devices 150 and 160 can be a mobile terminal such as a portable phone or a Personal Digital Assistant (PDA), or a fixed terminal such as a desktop computer.

FIG. 1B illustrates a VLC-based peripheral interface system. In the VLC-based peripheral interface system, a communication device 170 like a laptop or a desktop that has a visible light transceiver module, a portable mobile terminal 180 such as a hand-held phone or a PDA, a peripheral device 190 like a printer, or a small digital device like a digital camera or an mp3 player communicate with one another by visible light. A VLC-based peripheral device interface guarantees security and is implemented with low power.

The VLC can be more efficient through convergence with other wired or wireless communication systems using different communication media. Among them, a VLC system for providing information by lighting inside a building in conjunction with Power Line Communication (PLC) will be described below in detail.

FIG. 2 illustrates a conventional communication system using PLC and VLC in combination. In FIG. 2, a conventional method for providing location-based information to a user over a lamp network by PLC is illustrated (see, for example, Korea Patent Publication No. 10-2005-71617 entitled "Illumination Light Communication Device mark, filed by Nakagawa, et al., on Apr. 23, 2005). In the conventional technology, power and information are simultaneously transferred via a power line 103. A lamp 131 connected to the power line 103 modulates information received via the power line 103 to a visible light signal and provides the modulated information to a user 133. In this illustrated example, the information may about a piece of artwork 132 positioned in an area illuminated by the lamp 131.

FIG. 3 is a diagram illustrating a message exchange procedure between network entities in the conventional communication system using PLC and VLC illustrated in FIG. 2.

Referring to FIG. 3, a server 134 transmits information to lamps 131 forming a lamp network via a power line and the lamps 131 generate visible light signals by VLC. The conventional location-based service using a power line simply provides information about a fixed object to a mobile terminal, thus having limitations in information transmission.

Meanwhile, mobile communication terminals including portable phones, Personal Communications Services (PCSs), International Mobile Telecommunication-2000 (IMT-2000) terminals, and PDAs are equipped with various convenient functions such as a message transmission/reception function, a wireless Internet function, a schedule management function, a camera function, a music player function, an electronic dictionary function, and a navigation function in addition to a simple voice call function.

Among the convenient functions, a Global Positioning System (GPS)-based navigation function is used for indicating to a user a path and direction to a destination entered by the user. In general, since the navigation function is designed to provide information about the current location of a vehicle, it can search for a path based on map data stored in a database.

Beyond this vehicle navigation system, navigation for a walker as well as for a vehicle is under development. A pedestrian navigation device indicates a path to a destination to a user carrying the pedestrian navigation device and allows the user to monitor the user's progress along the path.

When a pedestrian enters a building or underground, however, the GPS-based navigation service is not available as GPS signals cannot be received. Accordingly, there exists a need for navigation inside a building along with the trend of increasing construction of large-scale building structures such as skyscrapers, huge shopping malls, and large underground arcades.

SUMMARY OF THE INVENTION

Accordingly, an aspect of exemplary embodiments of the present invention is to provide a navigation system for providing a navigation service by VLC inside a large-scale building structure blocking GPS signal reception, like a skyscraper, and a method for exchanging messages between a terminal and a navigation server in the navigation system.

In accordance with an aspect of exemplary embodiments of the present invention, there is provided a method for exchanging messages in a VLC navigation system, in which a map server generates a provision message in the form of visible light signals generated through lamps in an area where a navigation service is provided, a terminal that wants to implement the navigation service among terminals that have received the provision message transmits a registration request message to the map server, the map server transmits a registration response message for the registration request message to the terminal, the terminal transmits a map request message including information about a destination to the map server, the map server transmits a map response message including information about an optimum path to the destination to the terminal, and the terminal displays map information and the optimum path.

In accordance with another aspect of exemplary embodiments of the present invention, there is provided a method for exchanging messages in a VLC navigation system, in which a map server generates a provision message in the form of visible light signals through all lamps in an area where a navigation service is provided, a terminal that wants to implement the navigation service among terminals that have received the provision message transmits a registration request message to the map server, the map server transmits a registration response message for the registration request message to the terminal, the terminal transmits a map request message including information about a destination to the map server, the map server transmits a map response message including information about a path to the destination to the terminal, separately over a plurality of times, each time in a predetermined data amount, and the terminal displays map information and the optimum path.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an indoor navigation system for providing a navigation function within a large-scale building structure such as a skyscraper or a huge mall by VLC and a message exchange procedure between a mobile terminal and a navigation server in the navigation system.

To overcome the problem encountered with a conventional GPS-based navigation system that navigation information is not available in a GPS shadow area like building indoors, the present invention implements a VLC-based navigation system using visible light emitting from a light(s) inside a building, for example. In other words, the building lights are fixed and thus emit light to predetermined areas inside a building. Hence, when a building indoor map is acquired, each light is located, and an Identifier (ID) may b allocated to each light. The corresponding area illuminated by each light is thus known. Therefore, when a mobile terminal communicates with a light illuminating an area in which the mobile terminal is located, the mobile terminal can determine its current location by checking the ID of the light.

Figure 1A:
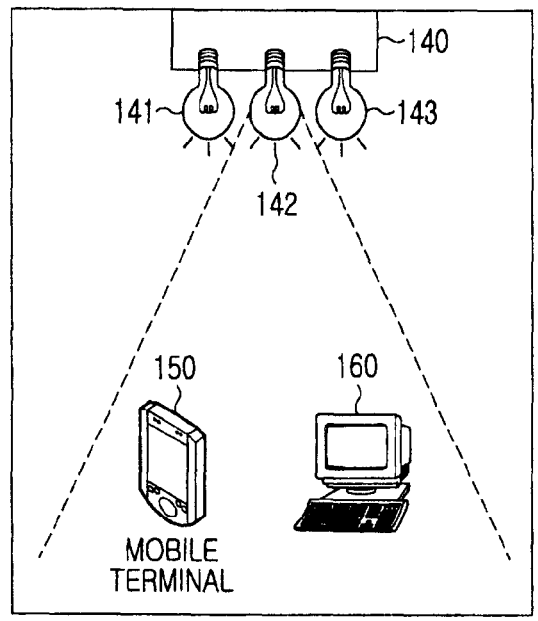
FIG. 1A illustrates a conventional VLC system.
Figure 1B:
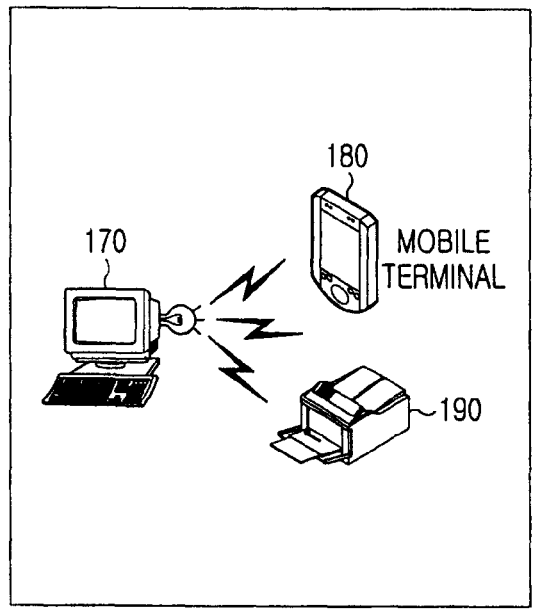
FIG. 1B illustrates a VLC-based peripheral interface system.
Figure 2:
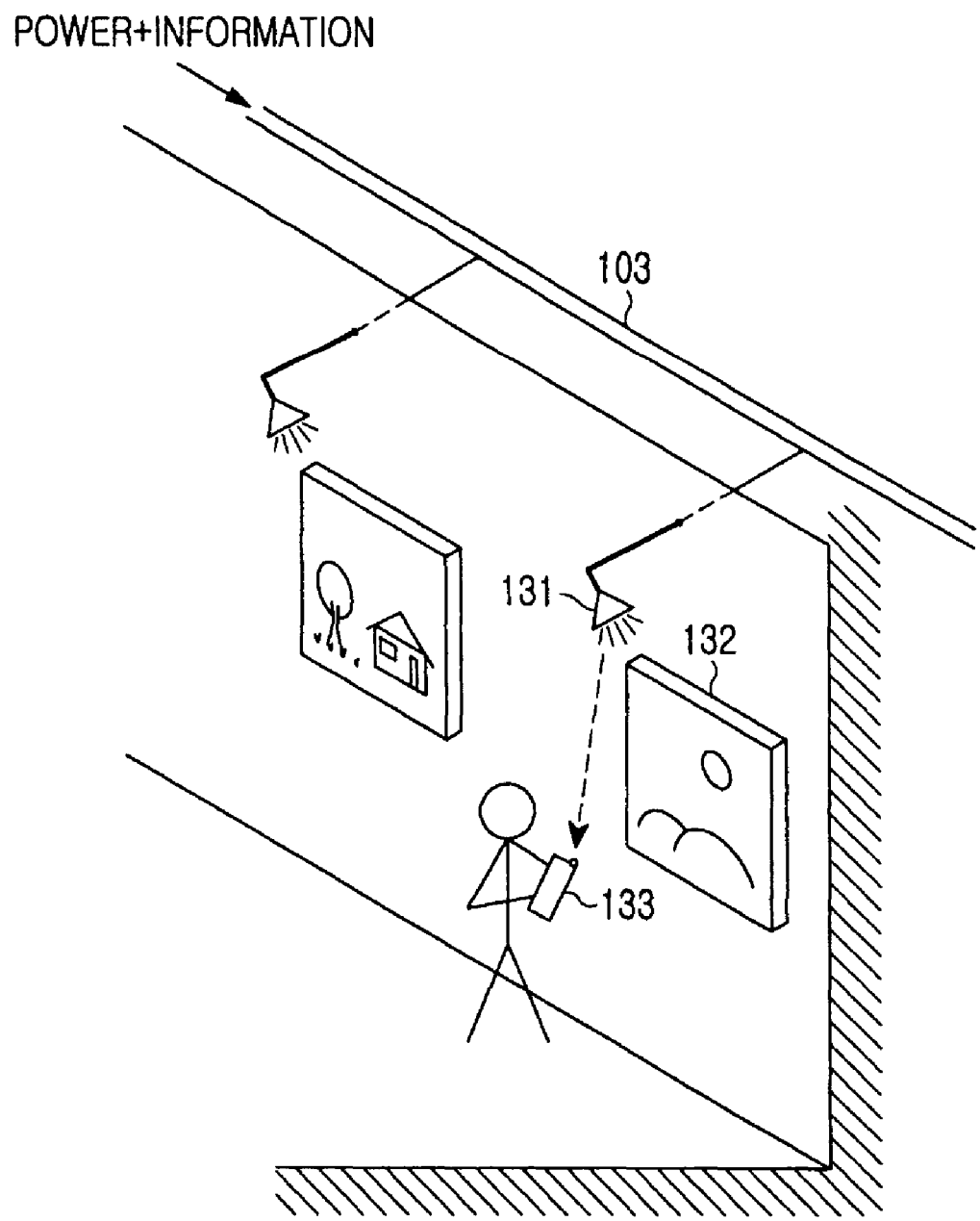
FIG. 2 illustrates a conventional communication system using PLC and VLC in combination.
Figure 3:
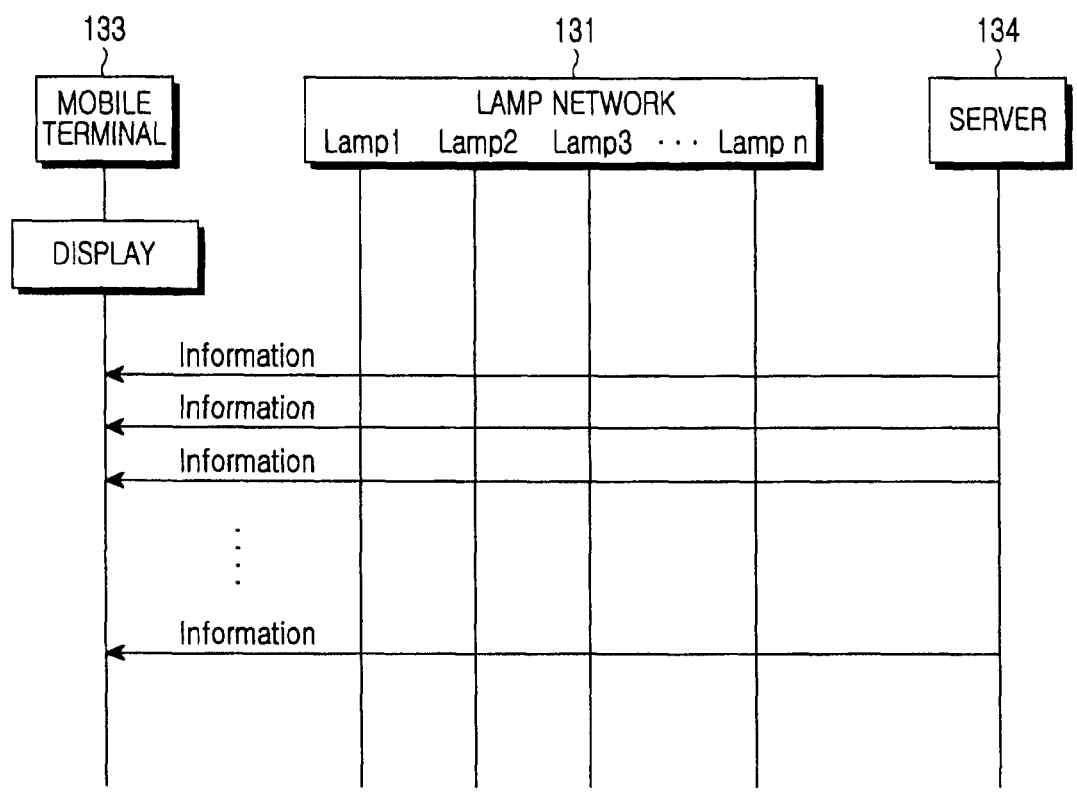
FIG. 3 is a diagram illustrating a message exchange procedure between network entities in the conventional communication system using PLC and VLC illustrated in FIG. 2.
Figure 4:
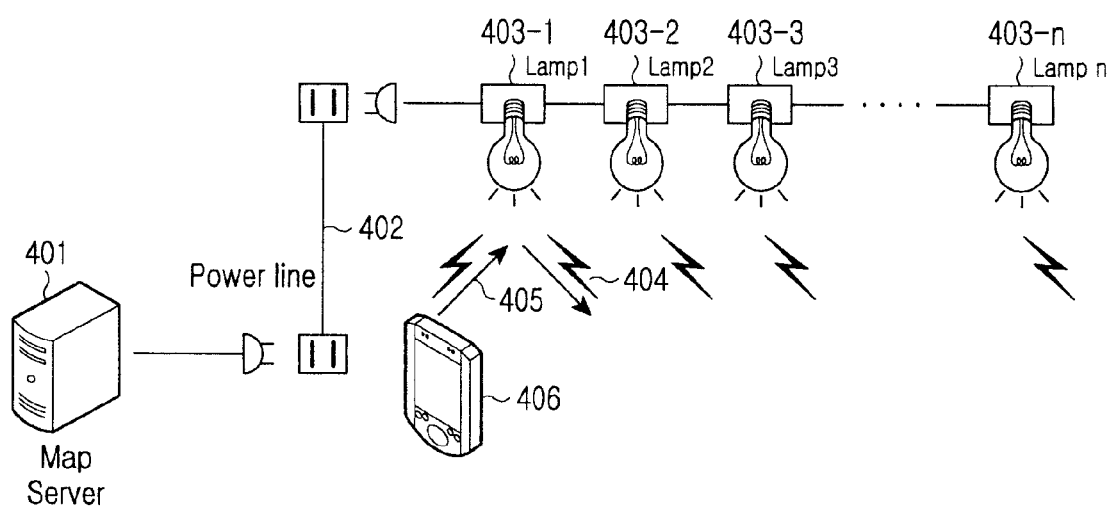
FIG. 4 illustrates the configuration of a navigation system according to an exemplary embodiment of the present invention.

FIG. 4 illustrates the configuration of a navigation system according to an exemplary embodiment of the present invention.

Referring to FIG. 4, the navigation system includes a navigation map server 401, a power line 402, lamps 403-1 to 403-n, and a VLC-enabled mobile terminal 406.

The navigation map server 401 stores data required for providing a navigation function. Thus, the navigation map server 401 stores map data about the inside of a building, information about the locations of the lamps 403-1 to 403-n, and the IDs of the lamps 403-1 to 403-n, and communicates with each lamp by PLC. Also, the navigation map server 401 receives destination information from the mobile terminal 406 via a lamp, calculates a path to the destination according to a predetermined navigation algorithm and the map data, and provides the determined path to the mobile terminal 406. Or the mobile terminal 406 can calculate the path based on its data depending on system implementation.

The power line 402 is used as a medium for PLC between the navigation map server 401 and the lamps 403-1 to 403-n. While communications are conducted between the navigation map server 401 and the lamps 403-1 to 403-n by PLC in an exemplary embodiment of the present invention, it can be further contemplated within the scope of the present invention that the communications can be made by other wired or wireless communication schemes.

The lamps 403-1 to 403-n are installed over the entire building. They are not only used as lights but also transmit/receive visible light signals 404 as visible light communication devices. The lamps 403-1 to 403-n have their specific IDs with which the mobile terminal 406 can locate itself and maneuver to its final destination. The lamps 403-1 to 403-n can be grouped according to their locations and IDs can be allocated on a group basis. For example, the lights may be grouped by floor, or by section of the building.

The mobile terminal 406 is equipped with a visible light transceiver module for transmitting and receiving visible light signals to and from the lamps 403-1 to 403-n. Also, the mobile terminal 406 has a basic structure required to support the navigation service, which may also include a display and an input portion for entering user data.

A message exchange procedure between the mobile terminal and the navigation server in the VLC navigation system according to an exemplary embodiment of the present invention will be described below.

Figure 5:
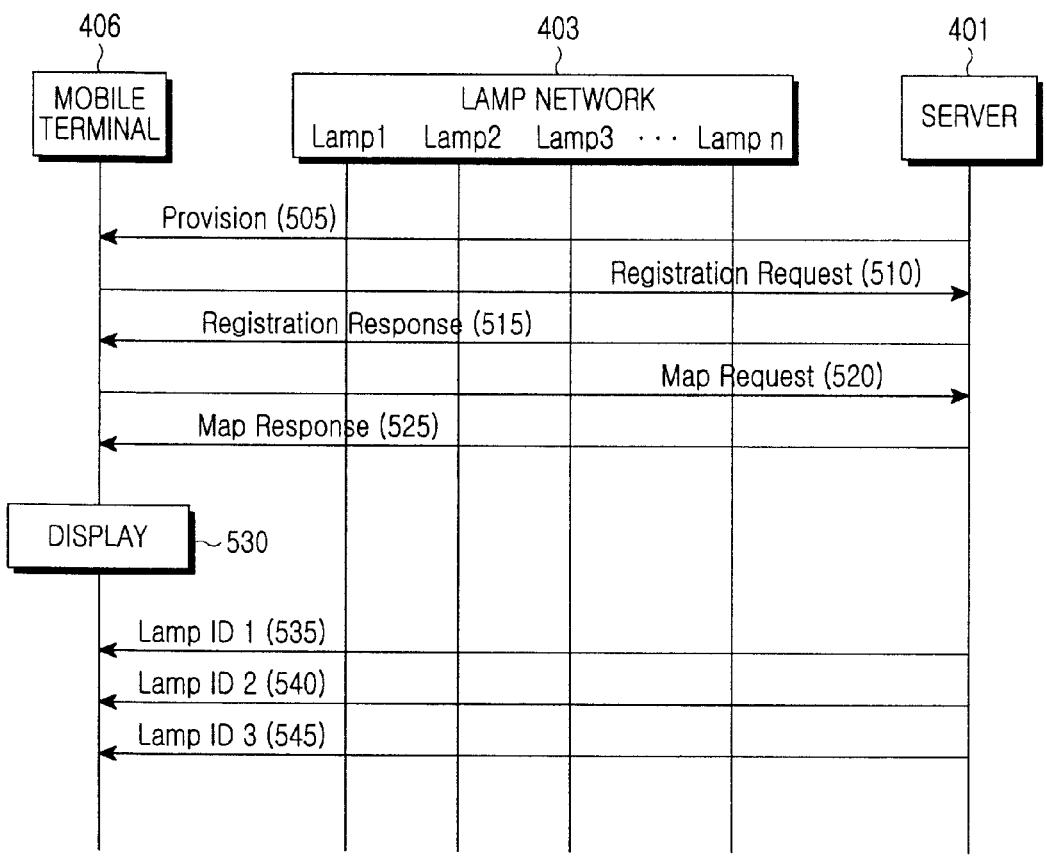
FIG. 5 is a diagram illustrating a message exchange procedure between network entities in the navigation system according to an exemplary embodiment of the present invention.

FIG. 5 is a diagram illustrating a message exchange procedure between network entities in the navigation system according to an exemplary embodiment of the present invention.

Referring to FIG. 5, the navigation map server 401 transmits a Provision message to mobile terminals via all the lamps 403 (i.e., Lamp1, Laim2 ... Lamp n) within the network of the navigation map server 401 in step 505. The Provision message includes at least the following information.

TABLE 1

Terminal ID (broadcasting ID)
Building ID
Version
Destination list

Referring to Table 1, Terminal ID identifies the mobile terminal. Particularly, Terminal ID is set to a broadcasting ID for generating the message through all lamps 403. Building ID indicates an ID of the building. Version provides information about a version of data that can be changed during running the navigation system, such as a destination list, map information, and information about the positions and IDs of the lamps. Destination list is a list of predetermined destinations within the building.

When the mobile terminal 406 receives the Provision message and wants to receive the navigation service, it transmits a Registration Request message to the navigation map server 401 in step 510. The Registration Request message has at least the following configuration (see Table 2).

TABLE 2

Terminal ID
Building ID

In step 515, the navigation map server 401 replies to the mobile terminal 406 with a Registration Response message configured at least as follows (see Table 3).

TABLE 3

Terminal ID
Building ID
Map

In Table 3, MAP provides map information about an area where the mobile terminal 406 is currently located.

The mobile terminal 406 then transmits a Map Request message to the navigation map server 401 to indicate its destination referring to Destination list set in the Provision message in step 520. The Map Request message has at least the following information (see Table 4).

TABLE 4

Terminal ID
Building ID
Version
Destination

In Table 4, Destination indicates the desired destination.

The navigation map server 401 calculates an optimum path to the desired destination and transmits to the mobile terminal 460 in step 525 a Map Response message including information about the path. The Map Response message includes at least the following information (see Table 5).

TABLE 5

Terminal ID
Lamp ID
Version
Map
Path

Referring to Table 5, Lamp ID provides the ID of a lamp corresponding to the current area in which the mobile terminal 406 is located. Since the mobile terminal 406 can move toward the destination during message transmission and reception, Lamp ID may also include the IDs of lamps e around the local area which the mobile terminal 406 can transmit and receive signals at its current position and the IDs of lamps within a range where the mobile terminal 406 is expected to move. The map may include information about an entire map covering the current location of the mobile terminal 406 to the destination. The path indicates at least one path from the current location to the desired destination. In one aspect of the invention, the path may be optimal with regard to the time to traverse from the current location to the desired destination. In another aspect, the path may be optimal with regard to the distance between the current location and the desired destination. In another aspect, the path may be selected based on a combination of distance and time required to traverse from the current location to the desired destination. As would be recognized, the path may consider obstacles that may be between the current location and the desired destination. For example, if the desired destination is a location on a floor directly above the user, then the path may consider taking a stairwell rather than walking the length of the current floor to take an elevator to the next floor.

In step 530, the mobile terminal 406 displays the map information and the path to the destination based on the received information. Then as the mobile terminal 406 starts to move along the path, the navigation map server 401 transmits Lamp ID messages to all lamps positioned along the path in which the mobile terminal 406 is moving in steps 535, 540 and 545. Each Lamp ID message includes at least the following information (see Table 6).

TABLE 6

Terminal ID
Lamp ID

The mobile terminal 406 can monitor its current location by the Lamp ID messages and determine whether it gets out of the path.

Figure 6:
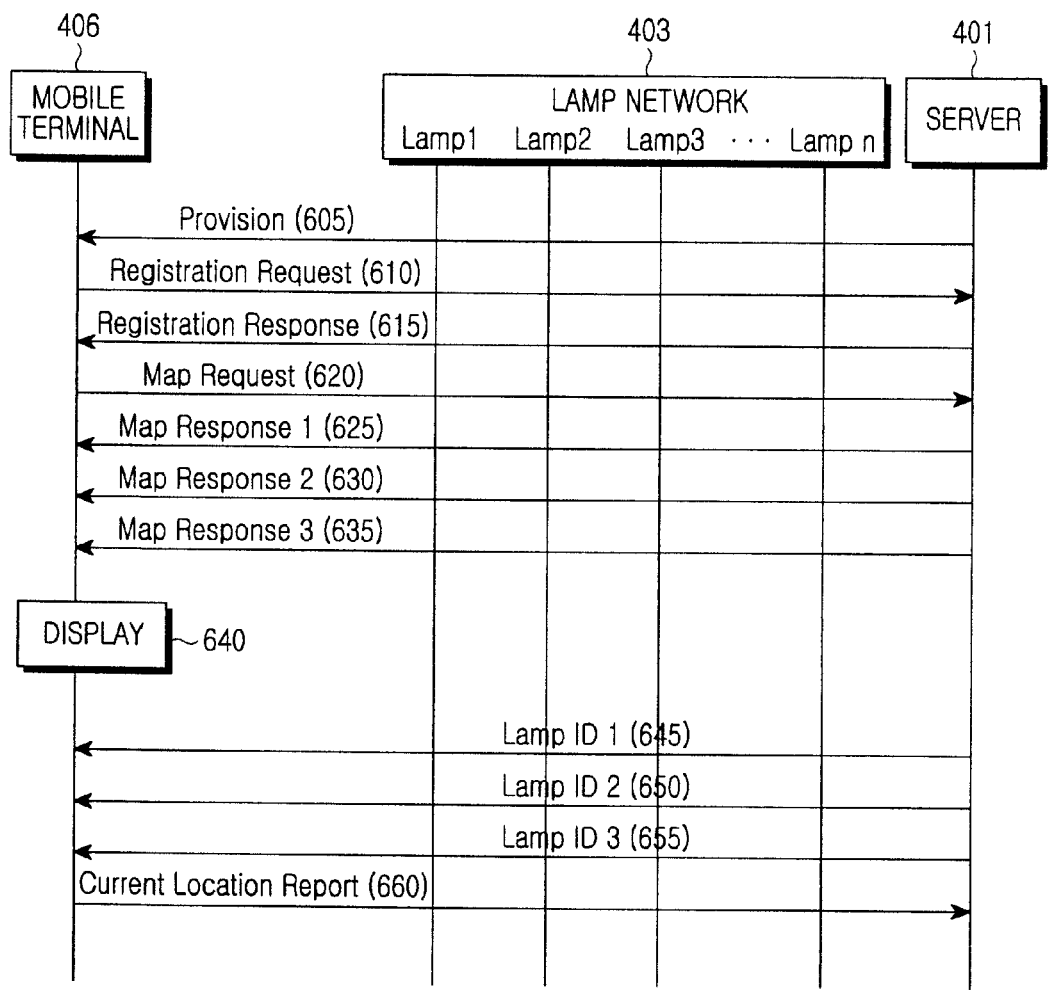
FIG. 6 is a diagram illustrating a message exchange procedure between network entities in the navigation system according to another exemplary embodiment of the present invention.

FIG. 6 is a diagram illustrating a message exchange procedure between network entities in the navigation system according to another exemplary embodiment of the present invention. While the navigation map server 401 transmits all of necessary information to the mobile terminal 406 at one time upon request of the mobile terminal 406 in the first exemplary embodiment of the present invention, in this exemplary embodiment, the map server 401 transmits segments of a necessary map sequentially to the mobile terminal 406 in the second exemplary embodiment of the present invention. Another feature of the second exemplary embodiment of the present invention is that the area of the building is divided into sections each having a predetermined size. The size of each section may be arbitrarily determined and different.

Referring to FIG. 6, the navigation map server 401 transmits a Provision message to mobile terminals via all the lamps 403 within the network of the navigation map server 401 in step 605. The Provision message includes at least the following information (see Table 7).

TABLE 7

Terminal ID (broadcasting ID)
Building ID
Version
Section list

Referring to Table 7, Terminal ID identifies the mobile terminal. Particularly, Terminal ID is set to a broadcasting ID for generating the message through all lamps 403. Building ID indicates an ID of the building. Version provides information about a version of data that can be changed during running the navigation system, such as a destination list, map information, and information about the positions and IDs of the lamps. Section list is a list of the sections of the building.

When the particular mobile terminal 406 receives the Provision message and wants to receive the navigation service, the mobile terminal 406 transmits a Registration Request message to the navigation map server 401 in step 610. The Registration Request message has the following configuration (see Table 8).

TABLE 8

Terminal ID
Building ID
Lamp ID
Section index

In Table 8, Lamp ID indicates the ID of a lamp corresponding to an area where the mobile terminal 406 is currently located. Since the mobile terminal 406 can move toward the destination during message transmission and reception, Lamp ID may include the IDs of lamps of those lamps which the mobile terminal 406 can transmit and receive signals at its current position and the IDs of lamps within a range where the mobile terminal 406 is expected to move. Section index indicates a section where the mobile terminal is currently located.

In step 615, the navigation map server 401 replies to the mobile terminal 406 with a Registration Response message configured at least as follows (see Table 9).

TABLE 9

Terminal ID
Building ID
Version
Section map
Current Location map

In Table 9, Section map provides entire map information about the current section of the mobile terminal 406 and Current Location map provides map information about the current area of the mobile terminal 406.

The mobile terminal 406 then transmits a Map Request message to the navigation map server 401 to indicate its destination in step 620. The Map Request message has at least the following information (see Table 10).

TABLE 10

Terminal ID
Building ID
Version
Destination

In Table 10, Destination indicates the desired destination.

The navigation map server 401 calculates a path to the desired destination and transmits a Map Response message including information about the path to the mobile terminal 460 in step 625. The Map Response message includes at least the following information (see Table 11).

TABLE 11

Terminal ID
Building ID
Map
Path

Referring to Table 11, Path indicates a path from the current location to the destination and Map includes information about a map covering the current location of the mobile terminal 406 to the destination. The map information can be transmitted in segments over a plurality of times in steps 630 and 635.

In step 640, the mobile terminal 406 displays the map information and the path to the destination based on the received information. Then as the mobile terminal 406 starts to move along the path the navigation map server 401 transmits Lamp ID messages to all lamps positioned along the path in which the mobile terminal 406 is moving in steps 645, 650 and 655. Each Lamp ID message includes at least the following information (see Table 12).

TABLE 12

Terminal ID
Lamp ID

The mobile terminal 406 can monitor its current location by the Lamp ID messages and determine whether the mobile terminal deviates from the provided path.

During moving to the destination, the mobile terminal 406 periodically notifies the navigation map server 401 of its current location by a Current Location Report message in step 660. The Current Location Report message includes at least the following information (see Table 13).

TABLE 13

Terminal ID
Lamp ID

As is apparent from the above description, the present invention advantageously provides a navigation function where GPS reception is blocked by VLC between lamps installed in the building, for example, to a mobile terminal and further defines messages and a message exchange procedure between the mobile terminal and a navigation server. Therefore, a user can be easily guided to his destination by the navigation function in a skyscraper or a large building.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for exchanging messages in a Visible Light Communication (VLC) navigation system, by a server, comprising:
    generating a provision message in the form of visible light signals through each of a plurality of lamps in an area where a navigation service is provided;
    receiving a registration request message from a terminal that wants to implement the navigation service among terminals that have received the provision message;
    transmitting a registration response message for the registration request message to the terminal;
    receiving a map request message including information about a destination from the terminal;
    transmitting a map response message including information about a path to the destination to the terminal.

2. The method of claim 1, further comprising transmitting lamp Identifier (ID) messages to all lamps positioned along a path in which the terminal moves.

3. The method of claim 1, wherein each of the lamp ID messages includes a terminal ID and a lamp ID.

4. A method for exchanging messages in a Visible Light Communication (VLC) navigation system, by a server, comprising:
    generating a provision message in the form of visible light signals through all lamps in an area where a navigation service is provided;
    receiving a registration request message from a terminal that wants to implement the navigation service among terminals that have received the provision message;
    transmitting a registration response message for the registration request message to the terminal;
    receiving a map request message including information about a destination from the terminal;
    transmitting a map response message including information about an optimum path to the destination to the terminal, separately in a plurality of messages, each message including a predetermined data amount.

5. The method of claim 4, further comprising transmitting lamp Identifier (ID) messages to all lamps positioned along a path in which the terminal moves by the map server.

6. The method of claim 4, wherein each of the lamp ID messages includes a terminal ID and a lamp ID.

7. A map server for Visible Light Communication (VLC) navigation system, comprising:
    a processor in communication with a memory, the memory including code which when accessed by the processor causes the processor to execute the following:
        generating a provision message in the form of visible light signals through each of a plurality of lamps in an area where a navigation service is provided;
        receiving a registration request message from a terminal that wants to implement the navigation service among terminals that have received the provision message;
        transmitting a registration response message for the registration request message to the terminal;
        receiving a map request message including information about a destination from the terminal;
        transmitting a map response message including information about a path to the destination to the terminal.

8. The map server of claim 7, wherein the transmitting a map response message including transmitting a map response message including information about an optimum path to the destination to the terminal, separately in a plurality of messages, each message including a predetermined data amount.

* * * * *